United States Patent [19]

Halila

[11] Patent Number: 5,333,443
[45] Date of Patent: Aug. 2, 1994

[54] SEAL ASSEMBLY

[75] Inventor: Ely E. Halila, Cincinnati, Ohio

[73] Assignee: General Electric Company, Cincinnati, Ohio

[21] Appl. No.: 60,626

[22] Filed: May 13, 1993

Related U.S. Application Data

[63] Continuation-in-part of Ser. No. 14,949, Feb. 8, 1993.

[51] Int. Cl.⁵ .............................................. F02C 7/20
[52] U.S. Cl. .................................. 60/39.31; 60/39.32; 60/752
[58] Field of Search .................. 60/39.31, 39.32, 752, 60/753, 754; 277/99, 150

[56] References Cited

U.S. PATENT DOCUMENTS

| | | | |
|---|---|---|---|
| 2,795,108 | 6/1957 | Saldin | 60/39.31 |
| 3,350,103 | 10/1967 | Ahlstone | 277/150 |
| 3,609,968 | 10/1971 | Mierley, Sr. et al. | 60/39.32 |
| 3,750,398 | 8/1973 | Adelizzi et al. | 60/39.32 |
| 4,422,300 | 12/1983 | Dierberger et al. | 60/754 |
| 4,480,436 | 11/1984 | Maclin | 60/39.32 |
| 4,555,901 | 12/1985 | Wakeman et al. | 60/39.32 |
| 4,614,082 | 9/1986 | Sterman et al. | 60/39.32 |
| 4,785,623 | 11/1988 | Reynolds | 60/39.32 |
| 4,848,089 | 7/1989 | Cramer | 60/39.32 |
| 4,901,522 | 2/1990 | Commaret et al. | 60/39.32 |
| 4,912,922 | 4/1990 | Maclin | 60/39.32 |
| 4,916,892 | 4/1990 | Pope | 60/39.32 |

FOREIGN PATENT DOCUMENTS

| | | | |
|---|---|---|---|
| 0216721 | 4/1987 | European Pat. Off. | 60/39.32 |
| 1052750 | 3/1959 | Fed. Rep. of Germany | 60/39.31 |
| 1211441 | 2/1966 | Fed. Rep. of Germany | 60/752 |
| 3625056 | 1/1988 | Fed. Rep. of Germany | 60/39.32 |

Primary Examiner—Richard A. Bertsch
Assistant Examiner—Howard R. Richman
Attorney, Agent, or Firm—Jerome C. Squillaro; David L. Narciso

[57] ABSTRACT

A seal assembly includes first and second segments spaced from a frame and defining between each other an elongate lateral gap. A plurality of radially adjoining leaf seals bridge the lateral gap between the segments and are supported by a plurality of spaced apart pins, with each pin having an enlarged head on one side of the frame and a root on an opposite side of the frame fixedly joined to a bottom one of the leaf seals. A compression spring is disposed around each of the pins between the frame and a top one of the leaf seals for urging the top leaf seal toward the bottom leaf seal to seal flow radially therebetween and between adjacent support pins, and for urging the bottom leaf seal in sealing contact with the first and second segments to seal flow radially therebetween through the lateral gap.

10 Claims, 6 Drawing Sheets

SEAL ASSEMBLY

This is a continuation-in-part of application Ser. No. 08/014,949 filed Feb. 8, 1993.

The present invention relates generally to gas turbine engines, and, more specifically, to an assembly for sealing adjacent liner segments in a low $NO_x$ combustor.

This invention herein described was made in the performance of work under a NASA contract and is subject to the provisions of Section 305 of the National Aeronautics and Space Act of 1958, Public Law 85-568 (72 Stat. 435;42 USC 2457).

BACKGROUND OF INVENTION

In a gas turbine engine, a fuel and air mixture is ignited for generating combustion gases from which energy is extracted for producing power, such as thrust for powering an aircraft in flight. In one aircraft designated High Speed Civil Transport (HSCT), the engine is being designed for powering the aircraft at high Mach speeds and high altitude conditions. And, reduction of exhaust emissions from the combustion gases is a primary objective for this engine.

More specifically, conventionally known oxides of nitrogen, i.e. $NO_x$, are environmentally undesirable and the reduction thereof from aircraft gas turbine engines is desired. It is known that $NO_x$ emissions increase when cooling air is injected into the combustion gases during operation. However, it is difficult to reduce the amount of cooling air used in a combustor since the combustor itself is typically made of metals requiring suitable cooling in order to withstand the high temperatures of the combustion gases.

In a typical gas turbine engine, a compressor provides compressed air which is mixed with fuel in the combustor and ignited for generating combustion gases which are discharged into a conventional turbine which extracts energy therefrom for powering, among other things, the compressor. In order to cool the combustor, a portion of the air compressed in the compressor is bled therefrom and suitably channeled to the various parts of the combustor for providing various types of cooling thereof including conventional film cooling and impingement cooling. However, any air bled from the compressor which is not used in the combustion process itself decreases the overall efficiency of the engine, but, nevertheless, is typically required in order to suitably cool the combustor for obtaining a useful life thereof.

One conventionally known, advanced combustor design utilizes non-metallic combustor liners which have a higher heat temperature capability than the conventional metals typically utilized in a combustor. Non-metallic combustor liners may be conventionally made from conventional Ceramic Matrix Composite (CMC) materials such as that designated Nicalon/Silicon Carbide (SiC) available from Dupont SEP; and conventional carbon/carbon (C/C) which are carbon fibers in a carbon matrix being developed for use in high temperature gas turbine environments. However, these non-metallic materials typically have thermal coefficients of expansion which are substantially less than the thermal coefficients of expansion of conventional superalloy metals typically used in a combustor from which such non-metallic liners must be supported.

Accordingly, during the thermal cycle operation inherent in a gas turbine engine, the various components of the combustor expand and contract in response to heating by the combustion gases, which expansion and contraction must be suitably accommodated without interference in order to avoid unacceptable thermally induce radial interference loads between the combustor components which might damage the components or result in an unacceptably short useful life thereof. Since the non-metallic materials are also typically relatively brittle compared to conventional combustor metallic materials, they have little or no ability to deform without breakage. Accordingly, special arrangements must be developed for suitably mounting non-metallic materials in a conventional combustor in order to prevent damage thereto from radial interference during thermal cycles and for obtaining a useful life thereof.

Furthermore, the various components of a conventional combustor must also typically withstand differential axial pressures thereon, and vibratory response without adversely affecting the useful life of the components. This provides additional problems in mounting non-metallic materials in the combustor since such mounting must also accommodate pressure loads and vibration of the components in addition to accommodating thermal expansion and contraction thereof.

Since non-metallic materials being considered for use in a combustor have higher temperature capability than conventional combustor metals, they may be substantially imperforate without using typical film cooling holes therethrough, which therefore reduces the need for bleeding compressor cooling air, with the eliminated film cooling air then reducing $NO_x$ emissions since such air is no longer injected into the combustion gases downstream from the introduction of the original fuel-/air mixture. However, it is nevertheless desirable to cool the back sides of the non-metallic materials in the combustor, with a need, therefore, for discharging the spent cooling air into the flowpath without increasing $NO_x$ emissions from the combustion gases.

One solution for these several problems is providing a segmented combustor as disclosed in the parent application identified above which includes axial rows of circumferentially adjoining non-metallic liner segments. Each of the segments includes two or more lugs which extend radially through the supporting frame for mounting the segments thereto. However, the adjoining four lateral sides of each of the segments where they join adjacent ones of the segments must be suitably sealed for preventing leakage of the cooling air therethrough into the combustor which would undesirably increase $NO_x$ emissions and decrease the overall efficiency of the gas turbine engine.

Conventional spline seals are known for sealing axially or circumferentially adjoining components and include a straight either flat or contoured spline seal member disposed in complementary grooves in the adjacent members. Since the spline seals are straight they require accurate assembly to ensure substantially continuous contact between the spline seal and the cooperating grooves to minimize leakage therebetween. However, manufacturing stack-up tolerances and thermal differential growth between components in the environment of an operating gas turbine engine distort the designed-for cooperation of the spline seal and the mating grooves thus allowing some leakage therebetween. This leakage in a low $NO_x$ combustor is undesirable since it will increase $NO_x$ emissions and reduce efficiency of the engine.

SUMMARY OF THE INVENTION

A seal assembly includes first and second segments spaced from a frame and defining between each other an elongate lateral gap. A plurality of radially adjoining leaf seals bridge the lateral gap between the segments and are supported by a plurality of spaced apart pins, with each pin having an enlarged head on one side of the frame and a root on an opposite side of the frame fixedly joined to a bottom one of the leaf seals. A compression spring is disposed around each of the pins between the frame and a top one of the leaf seals for urging the top leaf seal toward the bottom leaf seal to seal flow radially therebetween and between adjacent support pins, and for urging the bottom leaf seal in sealing contact with the first and second segments to seal flow radially therebetween through the lateral gap.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
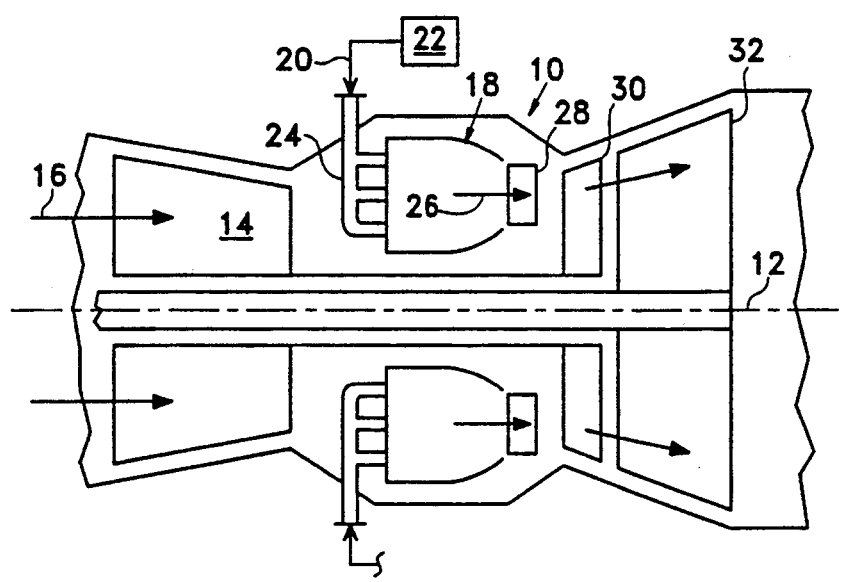
FIG. 1 is a schematic, longitudinal sectional view of a portion of a gas turbine engine including an annular combustor in accordance with one embodiment of the present invention.

Illustrated schematically in Figure I is a portion of an exemplary gas turbine engine 10 having a longitudinal or axial centerline axis 12. The engine 10 is configured for powering a High Speed Civil Transport (HSCT) at high Mach numbers and at high altitude with reduce oxides of nitrogen ($NO_x$) in accordance with one objective of the present invention. The engine 10 includes, inter alia, a conventional compressor 14 which receives air 16 which is compressed therein and conventionally channeled to a combustor 18 effective for reducing $NO_x$ emissions. The combustor 18 is annular structure disposed coaxially about the centerline axis 12 and is conventionally provided with fuel 20 from a conventional means 22 for supplying fuel which channels the fuel 20 to a plurality of circumferentially spaced apart fuel injectors 24 which inject the fuel 20 into the combustor 18 wherein it is mixed with the compressed air 16 and conventionally ignited for generating combustion gases 26 which are discharged axially downstream from the combustor 18 into a conventional high pressure turbine nozzle 28, and, in turn, into a conventional high pressure turbine (HPT) 30. The HPT 30 is conventionally joined to the compressor 14 through a conventional shaft, with the HPT 30 extracting energy from the combustion gases 26 for powering the compressor 14. A conventional power or low pressure turbine (LPT) 32 is disposed axially downstream from the HPT 30 for receiving therefrom the combustion gases 26 from which additional energy is extracted for providing output power from the engine 10 in a conventionally known manner.

Figure 2:
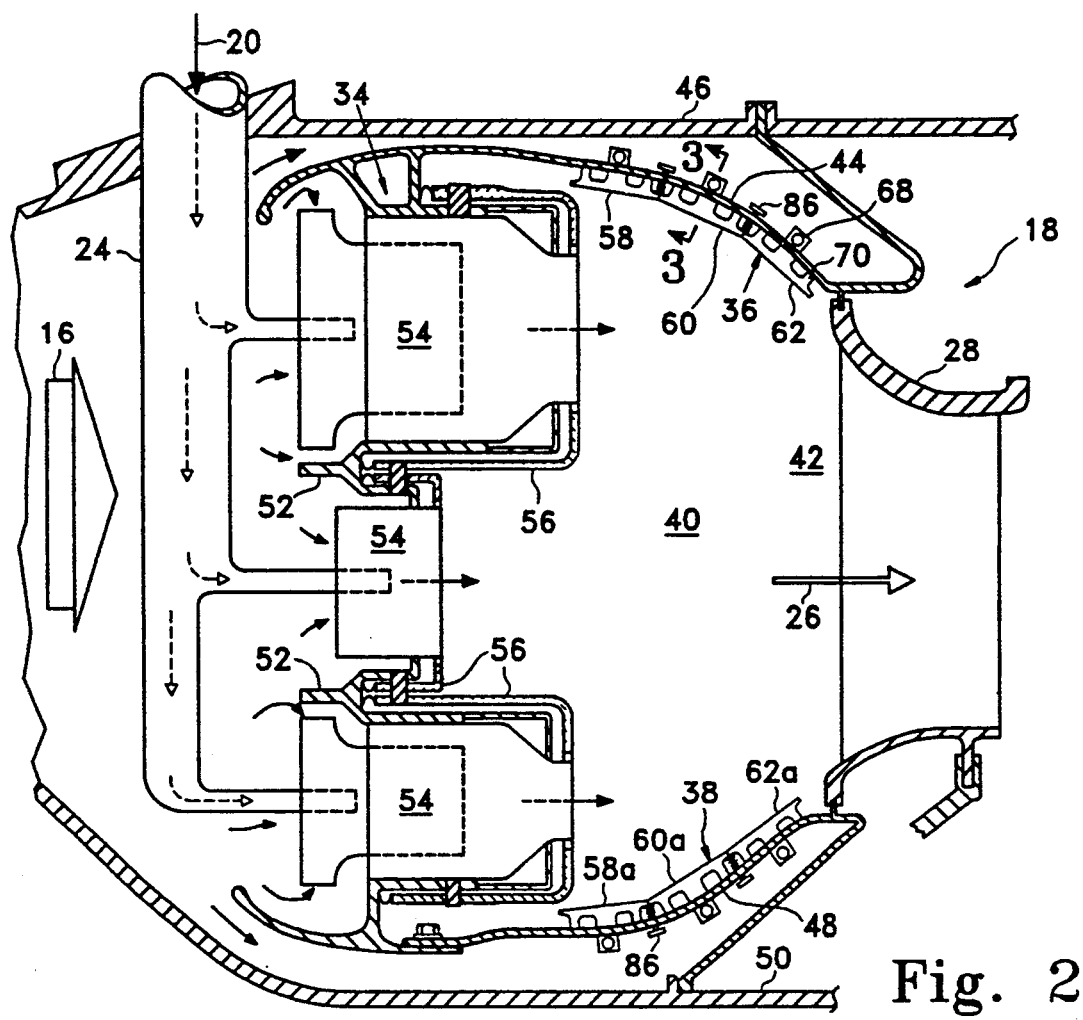
FIG. 2 is an enlarged schematic view of the top portion of the combustor shown in FIG. 1 illustrating an exemplary triple dome assembly including heat shields and segmented combustor linen sealed in accordance with one embodiment of the present invention.

Illustrated in more detail in FIG. 2 is the upper portion of the combustor 18 of FIG. 1 which includes at its upstream end an annular structural dome assembly 34 to which are joined an annular radially outer liner 36 and an annular radially inner liner 38. The inner liner 38 is spaced radially inwardly from the outer liner 36 to define therebetween an annular combustion zone 40, with downstream ends of the outer and inner linen 36, 38 deeming therebetween a combustor outlet 42 for discharging the combustion gases 26 therefrom and into the nozzle 28. In the exemplary embodiment illustrated in FIG. 2, the dome assembly 34 includes a radially outer, annular supporting frame 44 conventionally joined to an annular outer casing 46, and a radially inner, annular supporting frame 48 conventionally fixedly joined to an annular, radially inner casing 50. The dome assembly 34 may be otherwise conventionally supported to the outer and inner casings 46, 50 as desired.

In the exemplary embodiment illustrated in FIG. 2, the dome assembly 34 and the outer and inner frames 44, 48 are made from conventional metallic combustor materials typically referred to as superalloys. Such superalloys have relatively high temperature capability to withstand the hot combustion gases 26 and the various pressure loads, including axial loads, which are carried thereby due to the high pressure air 16 from the compressor 14 acting on the dome assembly 34, and on the linen 36, 38.

In a conventional combustor, conventional metallic combustion liners would extend downstream from the dome assembly 34, with each liner including a plurality of conventional film cooling apertures therethrough which are supplied with a portion of the compressed air 16 for cooling the liners, with the spent film cooling air then being discharged into the combustion zone 40 wherein it mixes with the combustion gases 26 prior to discharge from the combustor outlet 42. An additional portion of the cooling air 16 is also conventionally used for cooling the dome assembly 34 itself, with the spent cooling air also being discharged into the combustion gases 26 prior to discharge from the outlet 42. Bleeding a portion of the compressed air 16 from the compressor 14 (see FIG. 1) for use in cooling the various components of a combustor necessarily reduces the available air which is mixed with the fuel 20 and undergoes combustion in the combustion zone 40 which, in turn, decreases the overall efficiency of the engine 10. Furthermore, any spent cooling air 16 which is reintroduced into the combustion zone 40 and mixes with the combustion gases 26 therein prior to discharge from the outlet 42 typically increases nitrogen oxide ($NO_x$) emissions from the combustor 18 as is conventionally known.

For the HSCT application described above, it is desirable to reduce the amount of the air 16 bled from the compressor 14 for cooling purposes, and to also reduce the mount of spent cooling air injected into the combustion gases 26 prior to discharge from the combustor outlet 42 for significantly reducing $NO_x$ emissions over a conventionally cooled combustor.

In accordance with one object of the present invention, the outer and inner liners 36, 38 are preferably non-metallic material effective for withstanding heat from the combustion gases 26 and are also preferably substantially imperforate and characterized by the absence of film cooling apertures therein for eliminating the injection of spent film cooling air into the combustion gases 26 prior to discharge from the outlet 42 for reducing $NO_x$ emissions and also allowing higher temperature combustion within the combustion zone 40. Conventional non-metallic combustor liner materials are known and include conventional Ceramic Matrix Composites (CMC) materials and carbon/carbon as described above. These non-metallic materials have high temperature capability for use in a gas turbine engine combustor, but typically have low ductility and, therefore, require suitable support in the combustor 18 for accommodating pressure loads, vibratory response, and differential thermal expansion and contraction relative to the metallic dome assembly 34 for reducing stresses therein and for obtaining a useful effective life thereof.

Since conventional non-metallic combustor materials have a coefficient of thermal expansion which is substantially less than the coefficient of thermal expansion of metallic combustor materials such as those forming the dome assembly 34, the liners 36, 38 must be suitably joined to the dome assembly 34, for example, for allowing unrestricted or unrestrained thermal expansion and contraction movement relative to the dome assembly 34 to prevent or reduce thermally induced loads therefrom.

Furthermore, the metallic dome assembly 34 itself must also be suitably protected from the increased high temperature combustion gases 26 within the combustion zone 40 which are realizable due to the use of the non-metallic liners 36, 38.

Referring again to FIG. 2, the dome assembly 34 includes in this exemplary embodiment three annular domes 52 each having a respective plurality of circumferentially spaced apart carburetors 54 which are effective for discharging fuel/air mixtures. In the preferred embodiment illustrated in FIG. 2, the dome assembly 34 is a triple dome assembly with the top and bottom domes providing main combustion and the center dome providing pilot combustion, but may include one or more domes as desired.

Each of the carburetors 54 includes a conventional air swirler which receives a portion of the fuel 20 from the fuel injector 24 for mixing with a portion of the compressed air 16 and discharged through a tubular mixing can or mixer, with the resulting fuel/air mixture being discharged into the combustion zone 40 wherein it is conventionally ignited for generating the combustion gases 26.

In order to protect the metallic domes 52 and the carburetors 54 from the high temperature combustion gases 26, annular heat shields 56 are suitably mounted to the domes 52. Since the heat shields 56 are also preferably non-metallic material formed, for example, from a ceramic matrix composite, they are preferably imperforate. Accordingly, no film cooling holes are provided therein and, therefore, no spent film cooling air is injected into the combustion gases 26 which would lead to an increase in $NO_x$ emissions. However, a portion of the compressed air 16 may be suitably channeled against the back sides of the outer and inner liners 36, 38 as well as against the back sides of the heat shields 56 for providing cooling thereof, and then suitably reintroduced into the flowpath without increasing $NO_x$ emissions.

The combustor 18 illustrated in FIG. 2 is preferably a segmented combustor liner assembly with the outer and inner liners 36, 38 including two or more axial rows, with three exemplary rows being illustrated in FIG. 2. The liners 36, 38 are each directly joined to the frames 44, 48.

Figure 3:
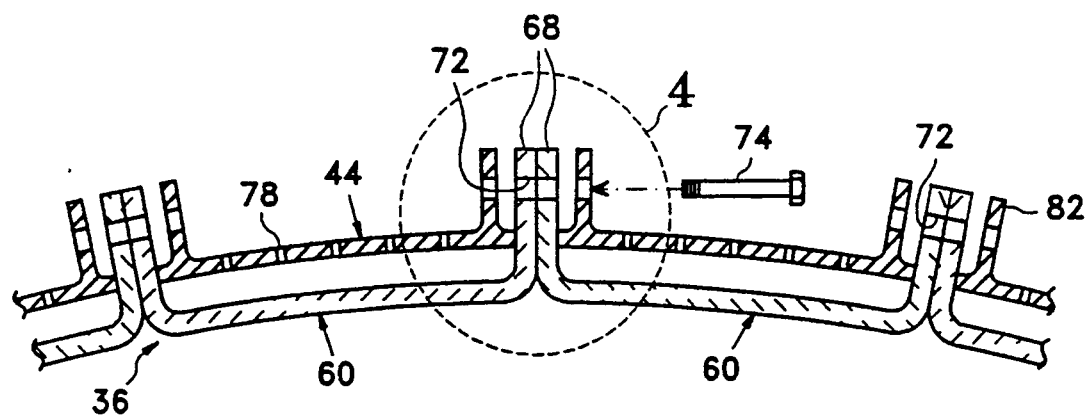
FIG. 3 is a transverse sectional view of the liner segments of FIG. 2 assembled to the frame and taken along line 3—3.
Figure 4:
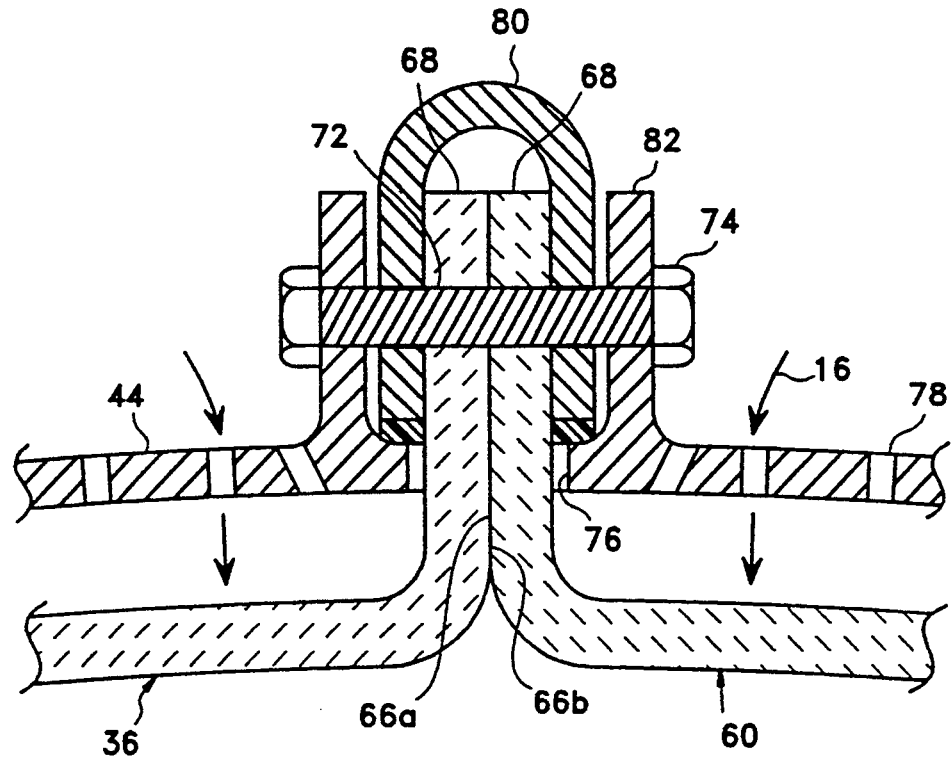
FIG. 4 is an enlarged detail view of adjoining lugs of adjacent liner segments joined to the frame by a fastener and seal assembly, within the dashed circle labeled 4 in FIG. 3.
Figure 5:
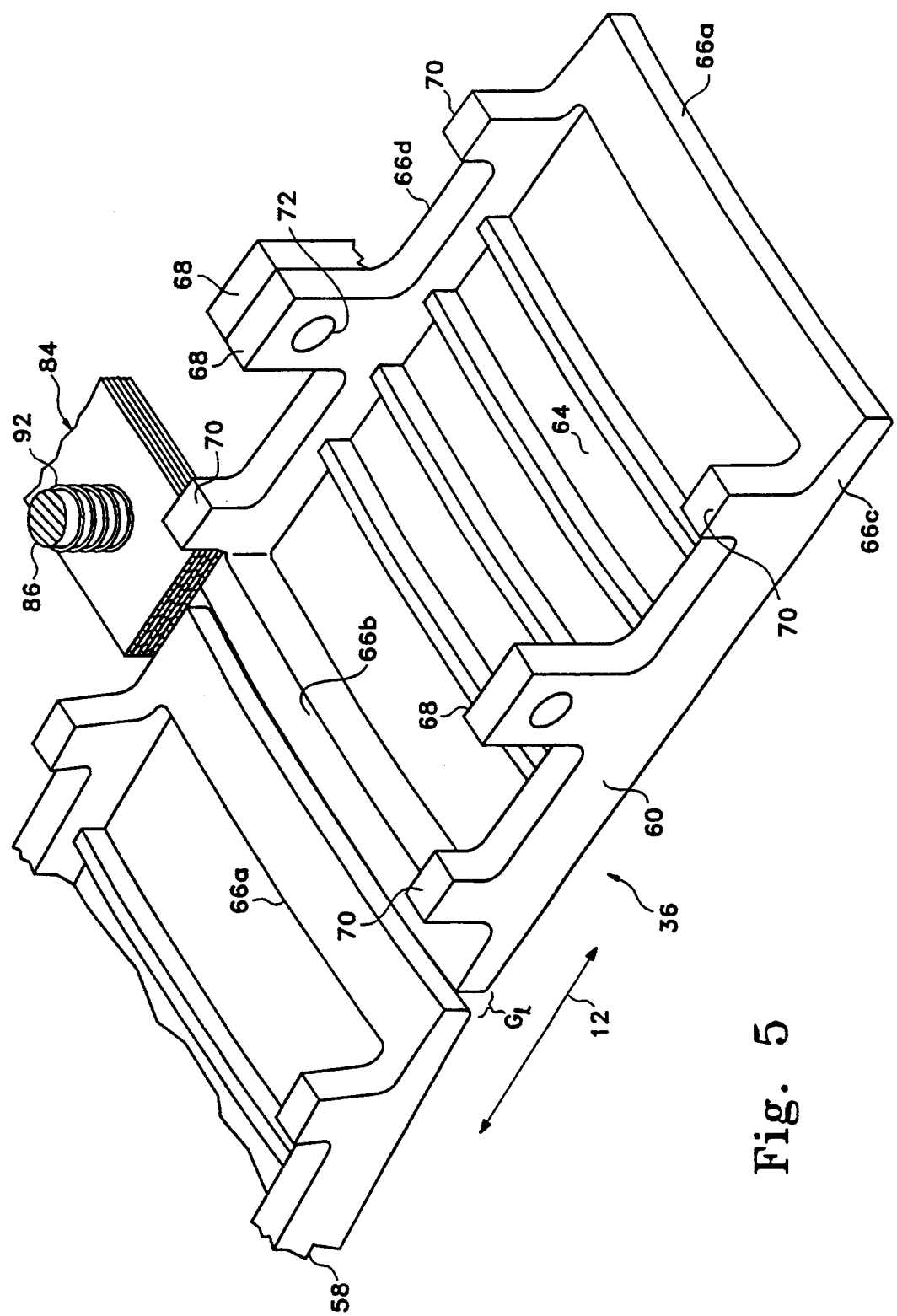
FIG. 5 is an enlarged partly sectional perspective view of two axially adjacent liner segments of the combustor illustrated in FIG. 2 showing a portion of a seal assembly in accordance with one embodiment of the present invention.

FIGS. 3-5 illustrate in more particularity the outer liner 36 and its assembly to the outer frame 44, which applies equal as well to the inner liner 38 and frame 48. The outer liner 36 includes a plurality of circumferentially adjoining first or forward liner segments 58 spaced radially inwardly from the stationary outer frame 44 and configured in an annular row. Similarly, a plurality of circumferentially adjoining second liner segments 60 are configured in an annular row and spaced radially inwardly from the frame 44 and spaced axially downstream from the first segment 58 as shown in FIG. 2. And as also shown in FIG. 2, a plurality of circumferentially adjoining third liner segments 62 are configured in an annular row and spaced radially inwardly from the frame 44 and axially downstream from the second segments 60. The liner segments 58-62 are configured to define a radially outer boundary for bounding the combustion gases 26. Whereas, an analogous three axial rows of liner segments 58a, 60a, 62a may be similarly used for the inner liner 38 as illustrated in FIG. 2 to define a radially inner boundary for bounding the combustion gases 26.

The liner segments 58-62 each preferably includes an imperforate panel 64 having oppositely facing top and bottom surfaces and four sidewalls forming a generally rectangular outer perimeter thereof including first and second opposite sidewalls 66a,b and third and fourth opposite sidewalls 66c,d. The top surface faces radially outwardly, and the bottom surface bounds the combustion gases 26. A pair of integral supporting legs or lugs 68 are disposed substantially perpendicularly to the panel top surface and extend from respective ones of the third and fourth sidewalls 66c, 66d, respectively, at the middle thereof. And, a plurality of integral standoffs or bosses 70 are disposed substantially perpendicularly to the panel top surface and extend from respective ones of the same two sidewalls 66c,d. As shown in FIG. 5, the lugs 68 are preferably completely straight and identical to each other with each having a vertical height measured from the panel top surface, and the bosses 70 are also identical to each other and have a vertical height measured from the panel top surface. The bosses 70 are shorter than the lugs 68.

As shown in FIGS. 3–5, each of the lugs 68 includes a retaining hole 72 at a distal end thereof for receiving a fastener 74 for supporting the liner segments to the outer frame 14. The outer frame 44 is disposed coaxially with the circumferentially segmented liner assembly about the centerline axis 12 and includes a plurality of access or supporting holes 76 (see FIG. 4), each receiving one or more respective ones of the lugs 68, with the panel bosses 70 being disposed in abutting contact with the inner surface of the outer frame 44 for maintaining the panel top surface at a predetermined spacing therefrom. The lugs 68 independently support each liner segment directly to the outer frame ,44, and the bosses 70 ensure that a suitable gap or controlled spacing height is maintained between the panel top surface and the inner surface of the outer frame 44 for providing a constant impingement cooling distance for optimal cooling of the segments. The outer frame 44 preferably includes a plurality of axially and circumferentially spaced apart impingement holes 78 for channeling the cooling air 16 radially through the frame 44 in impingement against the panel top surface for cooling the liner segments.

In the embodiment illustrated in FIGS. 2–5, the liner segments circumferentially adjoin each other to form one or more rows of annular, circumferentially segmented liner assemblies with adjacent ones of the panels 64 circumferentially abutting each other along respective ones of the first and second sidewalls 66a, 66b. In this way, the liner segments are carried directly by the outer frame 44, and differential thermal expansion and contraction movement relative thereto is no longer a significant concern. Therefore, no induced interference loads are developed. Instead, each segment is carded by the outer frame 44 and moves therewith as the outer frame 44 expands and contracts which substantially reduces stresses experience by the individual segments.

However, leakage of spent impingement cooling air from between the outer frame 44 and the segments 58–62 should be preferably controlled or eliminated if possible. As shown in FIG. 4, the lugs 68 are sealed in the frame supporting holes 76 for restricting leakage of the cooling air 16 therethrough. In this exemplary embodiment, an inverted, generally U-shaped hollow cap 80 is disposed over at least one of the distal ends of the lugs 68 and the frame supporting hole 76. The cap 80 is made of a suitable metal such as conventional INCO 718, and each cap 80 includes an aperture therethrough aligned with the lug retaining holes 72 for receiving therethrough a respective one of the fasteners 74. A suitable rectangular, radially compressible seal may be disposed between the bottom of the cap 80 around the perimeter of the supporting hole 76 for further sealing the frame 44 at the hole 76 to restrict leakage therethrough. Although the cap 80 could be used alone for supporting the lugs 68 to the outer frame 44, in the embodiment illustrated in FIG. 4, the outer frame 44 includes a plurality of integral support flanges 82 having apertures therein for receiving the fasteners 74 for securely mounting the liner segments to the outer frame 44.

Figure 6:
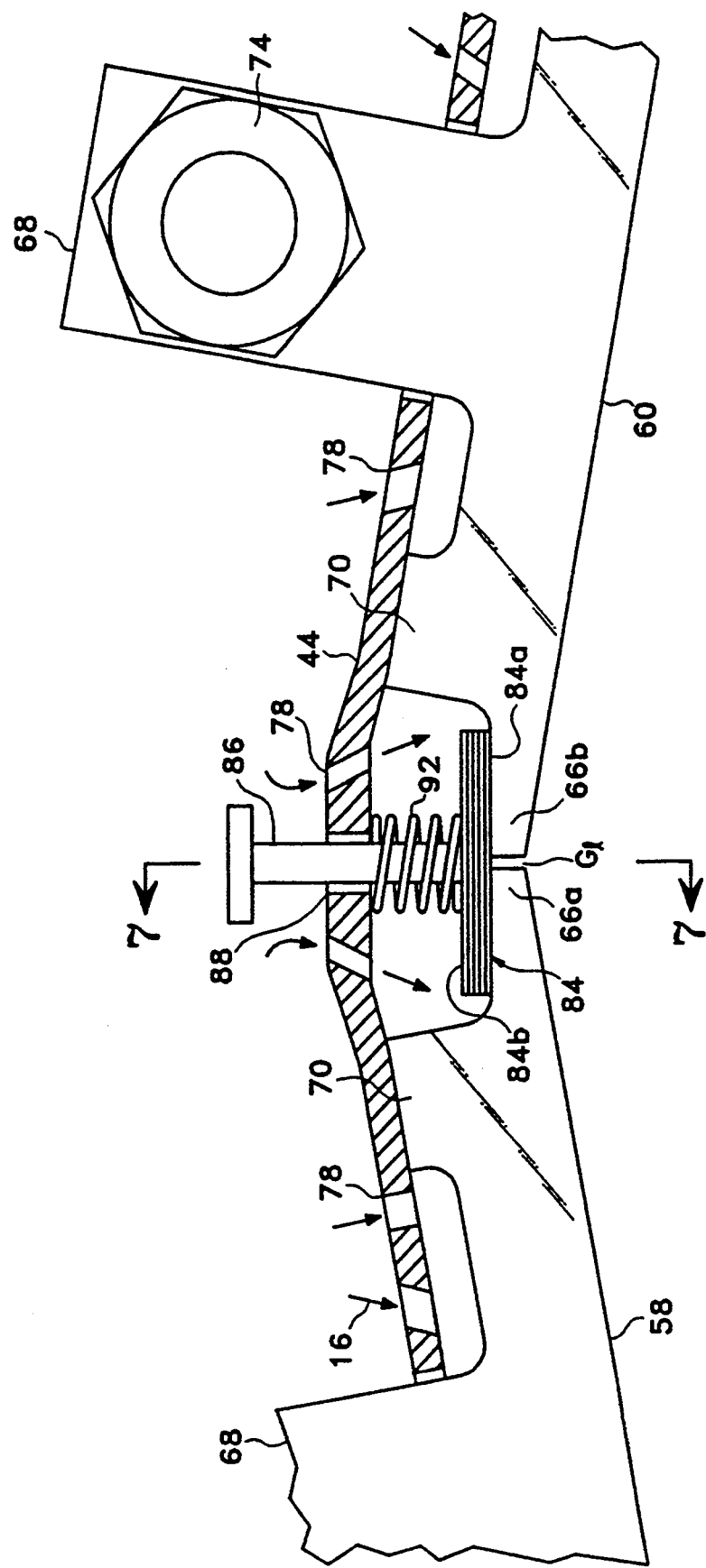
FIG. 6 is an enlarged partly sectional side view of the two liner segments and seal assembly therebetween illustrated in FIG. 5.
Figure 7:
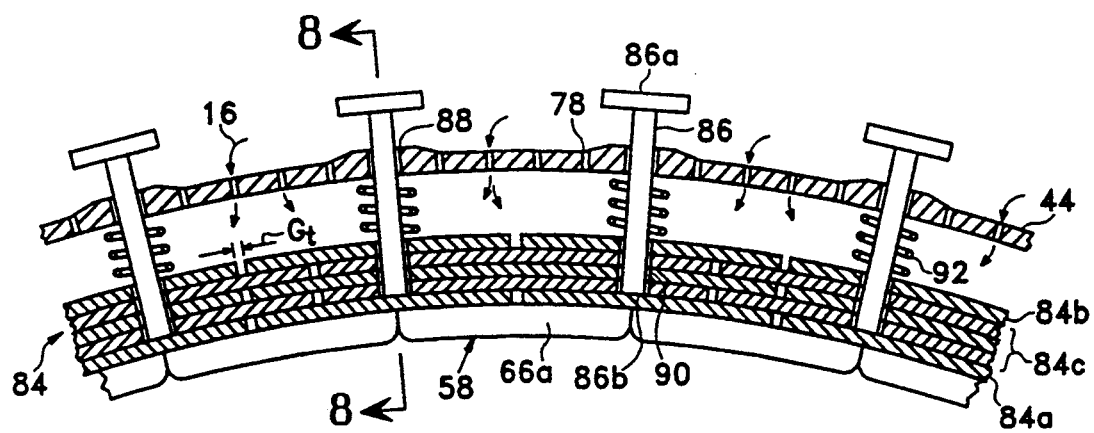
FIG. 7 is a sectional view of the seal assembly in FIG. 6 assembled to the frame and taken along line 7—7.

As shown in FIG. 4, the circumferentially adjoining sidewalls 66a,b of adjacent liner segments, such as segments 60, are preferably flat and abut each other for providing an effective seal therebetween. However, and referring to FIG. 5, the second segments 60 are spaced laterally or axially downstream from the first segments 58 to define respective circumferentially elongate, axial or lateral gaps $G_1$ extending axially therebetween which must be suitably sealed in accordance with the present invention for reducing or preventing leakage of the impingement cooling air 16 channeled radially inwardly through the impingement holes 78 against the top surfaces of the liner segments as illustrated in FIG. 4 for example. In accordance with a preferred embodiment of the present invention as illustrated in FIGS. 5–7, a plurality of arcuate, radially adjoining or stacked leaf seals 84 are disposed axially between adjacent ones of the liner segments 58–62, for example between the first and second segments 58 and 60, for bridging the lateral gap $G_1$ therebetween. In the exemplary embodiment illustrated, the lateral gap $G_1$ is an axial gap due to the axial spacing between the adjacent rows of first and second segments 58, 60.

A plurality of circumferentially spaced apart support pins 86 are provided for supporting the leaf seals 84 and extend radially through respective mounting holes 88 through the frame 44. Each pin 86 as shown in FIG. 7 has an enlarged head 86a at a distal end thereof on one side of the frame 44, e.g. on the radially outer side thereof, which prevents removal of the pin 86 downwardly through the frame 44. Each pin 86 also includes a root 86b at an opposite, proximal end thereof disposed on an opposite side of the frame 44, e.g., the radially inner side thereof, which is fixedly joined to a bottom one 84a of the leaf seals 84 by being conventionally brazed thereto for example. The pins 86 extend slidingly through the remainder of the several leaf seals 84 through retaining holes 90 therethrough.

As illustrated in FIGS. 6 and 7, a plurality of compression springs 92 are provided for urging the leaf seals 84 radially inwardly, with each spring 92 surrounding a respective one of the pins 86 and being sized and disposed in compression between the frame 44 and a top one 84b of the leaf seals 84. In this way, each compression spring 92 is effective for urging the top leaf seal 84b radially inwardly toward the bottom leaf seal 84a to seal flow radially therebetween and in the direction circumferentially between adjacent ones of the support pins 86. And, the springs 92 are also effective for urging the bottom leaf seal 84a in sealing contact with both the fast and second segments 58, 60 at their respective first and second sidewalls 66a,b as illustrated in FIG. 6 to seal flow radially therebetween through the lateral gap $G_1$. As shown in FIGS. 6 and 7, the bottom leaf seal 84a as well as the leaf seals thereabove are complementary in configuration to the top surface of the respective first and second sidewalls 66a,b of the axially adjacent segments 58, 60 to provide an effective contact surface area for sealing flow therebetween. In the preferred embodiment illustrated in FIG. 6, the leaf seals 84 extend axially forwardly and aft over the lateral gap $G_1$ and up to the corresponding bosses 70. Since the bosses 70 contact the inner surface of the frame 44 they maintain the adjacent first and second sidewalls 66a,b at accurate and equal spacings therefrom to ensure effective sting contact of the leaf seals 84 against the top of the sidewalls 66a,b without appreciable misalignment thereof for improving sealing. However, in the event of mismatch in alignment of the adjacent first and second sidewalls 66a,b, the mounting holes 88 have a suitably larger diameter than the outer diameter of the pins 86 which will allow the pins 86 to tilt as required and thusly tilt the leaf seals 84 for accommodating the misalignment and maintaining sealing contact.

Referring again to FIG. 7, the leaf seals 84 for this exemplary embodiment are configured in radially adjoining layers or rows, with each row having a plurality of laterally, e.g. circumferentially, adjoining leaf seals 84, with adjacent ones thereof in each row defining a transverse, or circumferential, gap $G_t$ therebetween which is disposed transversely or perpendicularly to the lateral gap $G_l$ shown between the first and second segments 58, 60 in FIG. 6. In the exemplary embodiment illustrated in FIGS. 1-3, the liner segments 58-62 form respective annular rows disposed coaxially about the centerline axis 12, with the axial or lateral gaps $G_l$ being disposed axially between adjacent rows. The lateral gaps $G_l$ also extend completely circumferentially around the liner segments also coaxially with the centerline axis 12. Correspondingly, the leaf seals 84 as illustrated in FIGS. 5-7 are configured in respective annular rows axially disposed between adjacent rows of the liner segments, and extend circumferentially around the first and second segment rows 58, 60 for example, with circumferentially adjacent ones of the leaf seals 84 in each row thereof circumferentially adjoining each other to define respective ones of the transverse or circumferential gaps $G_t$ disposed circumferentially therebetween.

In this way, the bottom leaf seals 84a axially bridge the adjacent liner segments 58, 60 as illustrated in FIG. 6 to provide sealing of the lateral gap $G_l$ therebetween. And, in order to seal the transverse gaps $G_t$ between the adjacent bottom leaf seals 84a as illustrated in FIG. 7, the additional one or more rows of the leaf seals 84 are provided to circumferentially overlap the transverse gaps $G_t$. In the simplest embodiment, the leaf seals 84 would include solely two rows, i.e. the bottom leaf seals 84a and the top leaf seals 84b, with the top leaf seals 84b circumferentially overlapping the bottom leaf seals 84a to seal the transverse gaps $G_t$ therebetween. However, in the preferred embodiment illustrated in FIG. 7 for example, at least one row, with three being illustrated for example, of intermediate ones of the leaf seals designated 84c are disposed radially between the top and bottom rows of leaf seals 84a,b for providing enhanced sealing. Each of the intermediate leaf seals 84c includes at least one of the retaining holes 90 therein slidingly receiving therethrough a respective one of the pins 86. As shown in FIG. 7, each of the leaf seal rows above the bottom leaf seals 84a circumferentially overlap in turn the transverse gaps $G_t$ of the leaf seal row directly therebelow. In this way, each of the transverse gaps $G_t$ of the underlying rows of leaf seals is circumferentially bridged by an overlying row of the leaf seals to provide sealing thereof.

As illustrated in FIG. 7, each of the bottom leaf seals 84a is preferably fixedly joined, by brazing for example, to only a single one of the respective pins 86 at the root 86b thereof. And, the top leaf seals 84b and the intermediate leaf seals 84c are simply retained by the pins 86 since the pins 86 pass through the complementary retaining holes 90 therein. In this way, the full, segmented annular assembly of the leaf seals 84 is allowed to expand and contract in diameter without restraint from circumferentially adjacent leaf seals 84, with corresponding enlargement and reduction in circumference thereof being accommodated by the transverse gaps $G_t$. The radial length of the pins 86 is suitably selected for spacing the heads 86a radially above the outer frame 44 to allow suitable expansion and contraction in diameter of the ring assembly of leaf seals 84. The compression springs 92 provide radially inwardly directed forces tending to decrease the overall diameter of the leaf seal ring assembly to ensure effective contact between the bottom leaf seals 84a and the axially adjacent liner segments to provide effective sealing completely circumferentially therearound.

Although in one embodiment of the invention, each of the leaf seals 84a–c may be joined to a respective single one of the pins 86 and suitably configured for circumferentially overlapping adjacent leaf seals, in the preferred embodiment illustrated in FIG. 7, each of the intermediate leaf seals 84c includes a plurality of the retaining holes 90 therethrough, with two per intermediate leaf seal 84c being illustrated, slidingly receiving therethrough respective ones of the pins 86. Each top leaf seal 84b in this preferred embodiment has a single retaining hole 90 slidingly receiving only a single respective one of the pins 86. This arrangement decreases the number of transverse gaps $G_t$ in each row of the intermediate leaf seals 84c and therefore increases the circumferential length between the transverse gaps $G_t$ of adjacent rows at many locations for improving sealing. Each of the leaf seals 84 preferably circumferentially overlaps an underlying leaf seal 84 for maximizing the circumferential distance between circumferentially adjacent ones of the transverse gaps $G_t$ for enhancing sealing.

As shown in FIG. 6 for example, since the leaf seals 84 are disposed radially between the outer frame 44 and the liner segments 58, 60, they are easily cooled by the impingement cooling air 16 channeled through the impingement holes 78 some of which holes 78 being located directly above the leaf seals 84. The spent impingement cooling air 16 may then flow axially downstream above the liner segments 58-62 for suitable discharge at the aft end of the combustor 18. In this way, the leaf seals 84 reduce or eliminate leakage of the cooling air 16 between axially adjacent ones of the liner segments 58-62 into the combustion zone 40 which would undesirably increase $NO_x$ emissions.

Figure 8:
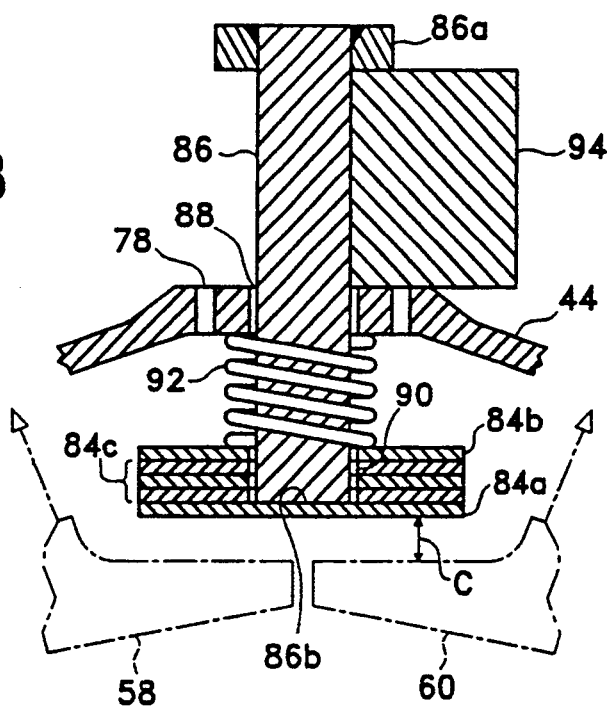
FIG. 8 is an enlarged partly sectional view of one of the support pins in the seal assembly illustrated in FIG. 7 taken along line 8—8 showing a temporary installation shim for allowing unobstructed installation of two adjacent liner segments shown in phantom.

FIG. 8 illustrates the initial assembly of the leaf seals 84 to the frame 44. The liner segments 58, 60 are shown in phantom in theft installed positions since they are installed after assembly of the leaf seals 84 to the frame 44. The mounting pins 86 are initially provided without the enlarged heads 86a thereon but with the springs 92 and leaf seals 84 preassembled therewith. The mounting pins 86 are inserted radially upwardly through the mounting holes 88 and then the respective heads 86a are conventionally tack welded thereto. The compression springs 92 are then suitably compressed by pushing the pins 86 radially outwardly and then a temporary block shim 94 is positioned between the head 86a and the frame 84 to retain the leaf seals 84 at a suitable diameter to provide a radial clearance C between the bottom leaf seal 84a and the liner segments 58, 60 to be installed. The liner segments 58, 60 are then suitably installed and joined to the outer frame 44, and the shims 94 are removed for allowing the compression springs 92 to bias the leaf seals 84 in compressive contact against the tops of the liner segments 58, 60.

Figure 9:
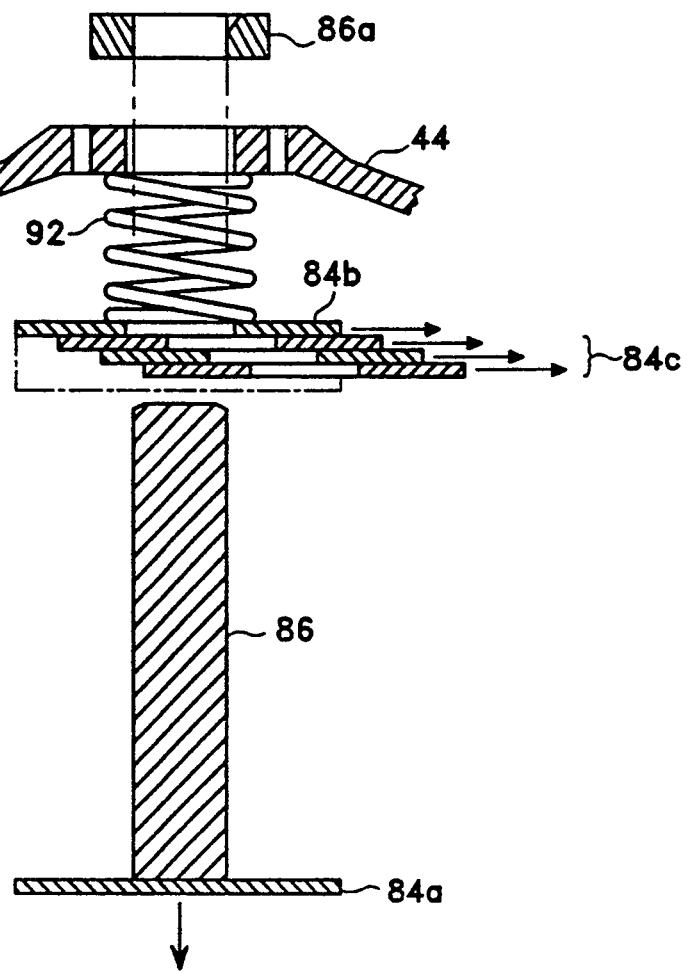
FIG. 9 is an exploded view of an exemplary one of the support pins and leaf seals illustrated in FIG. 8 showing its disassembly from the frame.

In order to disassemble one or more of the mounting pins 86 and its respective leaf seals 84, the liner segments 58, 60 are conventionally removed to provide access thereto. The tack welds joining the head 86a to the pin 86 are conventionally removed so that the pin 86 and the integral bottom leaf seal 84a as illustrated in FIG. 9 may be simply removed by being pulled radially inwardly from the outer frame 44. Since the intermediate leaf seals 84c circumferentially overlap adjacent ones of each other and the bottom leaf seals 84a of adjacent pins 86 not being removed as illustrated in FIG. 7, each of the intermediate leaf seals 84c is pulled axially from its installed position as shown in FIG. 9 for removal from the interleaved adjacent leaf seals 84. Similarly, the top leaf seal 84b is also removed axially from the leaf seals 84 remaining behind. The compression spring 92 may then be simply removed since access is now provided thereto upon removal of the leaf seals 84 therebelow. Since the intermediate leaf seals 84c are preferably joined to two adjacent pins 86, then the two adjacent pins 86 must both be removed for removing the intermediate leaf seals 84c joined thereto. In order to install a replacement pin or pins 86 and its corresponding leaf seals 84, the above process is simply reversed.

Figure 10:
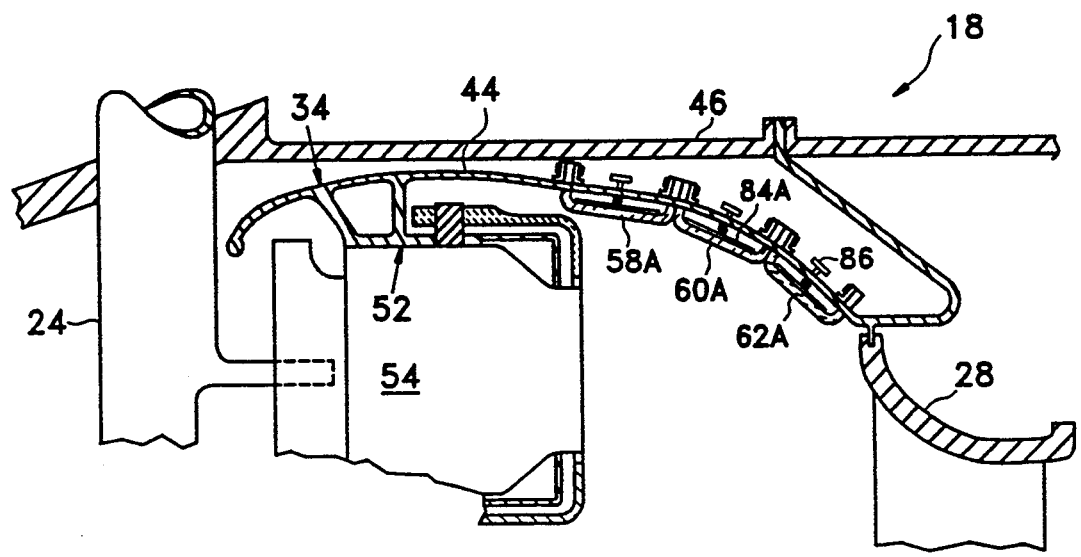
FIG. 10 is an enlarged, partly sectional view of the top portion of the combustor illustrated in FIG. 2 showing a segmented liner and seal assembly in accordance with a second embodiment of the present invention.

Illustrated in FIG. 10 is an alternate embodiment of the present invention wherein the liner segments designated 58A, 60A, and 62A are joined to the outer frame 44 in a different configuration than that illustrated in FIG. 1. In this configuration the segments 58A–62C are axially aligned with each other and axially adjacent ones thereof abut each other in sealing contact therebetween. Circumferentially adjacent ones of the liner segments are spaced from each other for providing the lateral gap therebetween which is a circumferential gap. The leaf seals designated 84A instead of extending circumferentially as illustrated in FIG. 7 extend axially for bridging the circumferential gaps between the circumferentially adjacent liner segments. Otherwise, the embodiment illustrated in FIG. 10 is structurally and functionally equivalent to the embodiment illustrated in FIG. 2.

Accordingly, the improved seal assembly disclosed above provides effective sealing been adjoining liner segments, with the articulation between the adjoining leaf seals 84 and the mounting thereof by the radial pins 86 and compression springs 92 allowing the assembly limited movement to conform to the gaps between the adjacent liner segments for maintaining sealing therebetween. The leaf seals 84 themselves are made of conventional high temperature material and are effectively cooled by the impingement air 16 channeled thereabove which is discharged axially above the liner segments and is not therefore returned into the combustion zone 40 which would otherwise increase $NO_x$ emissions. The seal assembly is readily assembled to the frame 44 and does not interfere with the assembly or disassembly of the adjacent liner segments, and, therefore, damage thereto may be readily avoided. And, portions of the leaf seal assembly may be readily replaced without requiring complete disassembly of the liner segments, with only adjacent liner segments being removed for providing access to the leaf seals to be replaced.

As indicated above, a substantially identical leaf seal assembly may be also used for the inner liner 38, with the orientation of the respective components thereof merely being inverted for attachment to the radially inner frame 48. Although the invention has been described with respect to combustor liner segments, the leaf seal assembly may be utilized for sealing gaps between any analogous segments if desire.

While them have been described herein what am considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A seal assembly for an annular gas turbine engine comprising:
   a stationary frame;
   a first segment spaced radially from said frame;
   a second segment spaced radially from said frame, and spaced laterally from said first segment to define an elongate lateral gap $G_1$ therebetween;
   a plurality of radially adjoining leaf seals bridging said lateral gap $G_1$;
   a plurality of spaced apart pins supporting said leaf seals and extending radially through said frame, each having an enlarged head on one side of said frame, and a root on an opposite side of said frame fixedly joined to a bottom one of said leaf seals, said pins extending slidingly through the remainder of said leaf seals; and
   a plurality of compression springs each disposed in compression between said frame and a top one of said leaf seals for urging said top leaf seal toward said bottom leaf seal to seal flow radially therebetween and between adjacent ones of said support pins, and for urging said bottom leaf seal in sealing contact with said first and second segments to seal flow radially therebetween through said lateral gap $G_1$.

2. A seal assembly according to claim 1 wherein said leaf seals are configured in radially adjoining rows, each row having a plurality of laterally adjoining leaf seals, adjacent ones defining a transverse gap $G_t$ therebetween disposed substantially perpendicularly to said lateral gap $G_1$ between said first and second segments.

3. A seal assembly according to claim 2 farther comprising at least one intermediate one of said leaf seals disposed radially between said top and bottom leaf seals, and having a retaining hole slidingly receiving therethrough one of said pins.

4. A seal assembly according to claim 3 further comprising:
   a plurality of circumferentially adjoining ones of said first segments configured in an annular row;
   a plurality of circumferentially adjoining ones of said second segments configured in an annular row and spaced axially from said first segments to define respective ones of said lateral gaps $G_1$ extending axially therebetween; and wherein
   said leaf seals are configured in respective annular rows and extend circumferentially around said rows of first and second segments, with adjacent ones of said leaf seals in each row thereof circumferentially adjoining each other to define respective ones of said transverse gaps $G_t$ extending circumferentially therebetween.

5. A seal assembly according to claim 4 wherein:
   each of said bottom leaf seals is fixedly joined to only a single one of said pins; and
   each of said intermediate leaf seals includes a plurality of said retaining holes therethrough slidingly receiving therethrough respective ones of said pins.

6. A seal assembly according to claim 5 wherein said first and second segments are combustor liner segments for bounding combustion gases, with said bottom leaf seals facing said combustion gases.

7. A seal assembly according to claim 6 wherein said first and second liner segments are configured to define a radially outer boundary for said combustion gases.

8. A seal assembly according to claim 6 wherein said first and second liner segments are configured to define a radially inner boundary for said combustion gases.

9. A seal assembly according to claim 6 wherein each of said first and second liner segments includes a pair of supporting lugs extending through complementary supporting holes in said frame for being supported thereto.

10. A seal assembly according to claim 6 wherein said first and second liner segments are non-metallic and selected from the group including ceramic matrix composite (CMC) and carbon/carbon (C/C).

* * * * *